United States Patent [19]

Clarke

[11] 4,349,833
[45] Sep. 14, 1982

[54] APPARATUS FOR DIGITAL DEMODULATION OR MODULATION OF TELEVISION CHROMINANCE SIGNALS

[75] Inventor: Christopher K. P. Clarke, Crawley, England

[73] Assignee: British Broadcasting Corporation, London, England

[21] Appl. No.: 185,069

[22] Filed: Sep. 8, 1980

[30] Foreign Application Priority Data

Sep. 12, 1979 [GB] United Kingdom ................. 7931678

[51] Int. Cl.$^3$ .......................................... H04N 9/535
[52] U.S. Cl. ....................................... 358/23; 358/13
[58] Field of Search .................................. 358/13, 23

[56] References Cited

U.S. PATENT DOCUMENTS 4,270,139 5/1981 Flamm et al. ......................... 358/23

Primary Examiner—Robert L. Richardson
Attorney, Agent, or Firm—Robert F. O'Connell

[57] ABSTRACT

If an N.T.S.C. signal is to be demodulated using a line-locked sampling rate such as 800 times the line frequency, the ratio between the sampling period and the subcarrier period has the awkward value of 455/1600. Line-locked sampling is nevertheless desirable, e.g. in digital standards conversion. The subcarrier digital signals for digital demodulation are derived with the correct frequency from the sampling rate clock pulses CP by an adder and accumulator into which the number 582 is added modulo-2048 (the register is an 11-bit register) to generate an 11-bit number which represents the subcarrier phase angle at each sampling pulse and which addresses a ROM providing sin and cos values representing subcarrier samples. 582/2048 is not exactly equal to 455/1600 but 2048 is a desirable denominator as it is a power of 2 and implies a ROM of suitable size.

$$582 + \left( \frac{16384}{40960} \right) / 2048$$

is exactly equal to 455/1600. Another adder and accumulator counts modulo-40960 by increments of 16384 and when this adder overflows, an extra 1 is added in through the carry-in to the first adder. Modulo 40960 is set up by altering 10256 to 40960 when the overflow occurs. Alternative numerical values are disclosed which apply to a PAL system with sampling rate 816 times line rate.

Phase lock to the color burst is established by examination of the V output of the main demodulators during the color burst. V=sine $\theta$ where $\theta$ is the phase error. This quantity is applied via a negative feedback loop to effect fine adjustment of the numbers 40960 and 16384. Similar provisions for PAL are disclosed as is the generation of a PAL switch signal of the correct phase. The apparatus can also be employed as a modulator.

8 Claims, 5 Drawing Figures

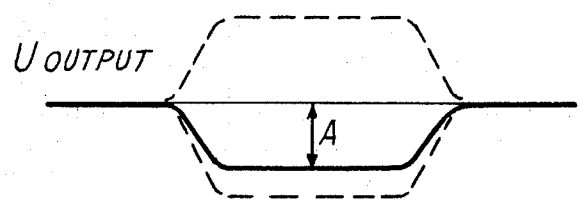
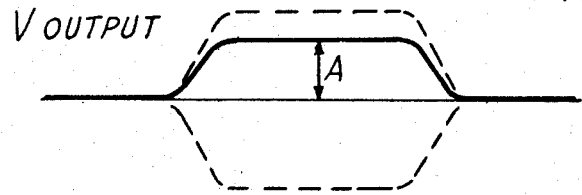
FIG. 2
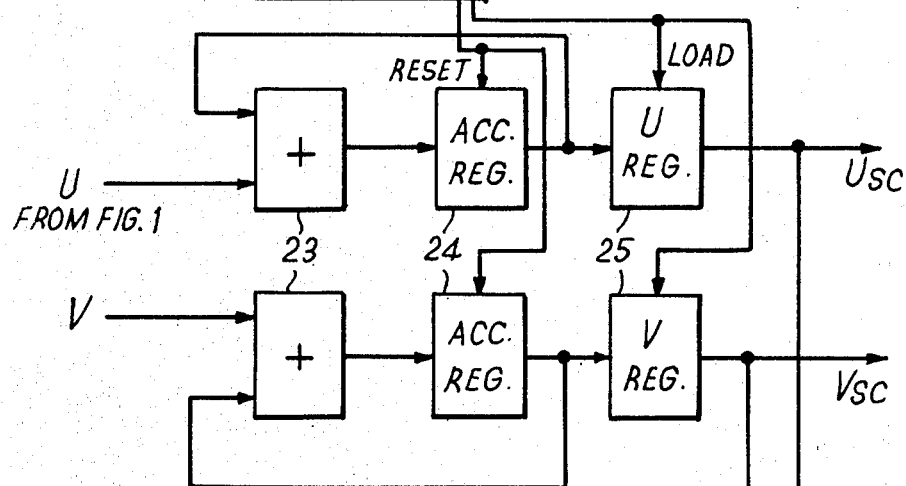
FIG. 3
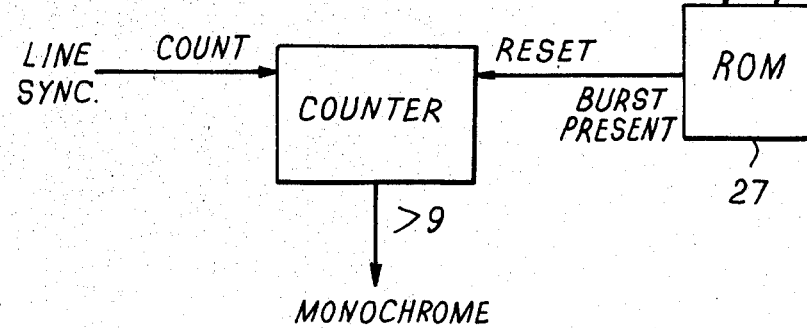

APPARATUS FOR DIGITAL DEMODULATION OR MODULATION OF TELEVISION CHROMINANCE SIGNALS

Considerable interest now attaches to processing television signals digitally, e.g. in effecting standards conversion and many other operations. It is frequently necessary in such operations to demodulate or modulate the chrominance signals and, in its broadest aspect, the present invention seeks to provide an apparatus which will perform the demodulation or modulation in a digital manner. More particularly, the invention provides apparatus which can achieve this object using a line-locked sampling grid, i.e. with a sampling frequency which is an integral multiple of the line frequency. As will be shown below, such a system leads to awkward relationships between sampling and subcarrier frequencies, particularly with PAL signals. The present invention can deal with the problem thus posed, again as will be shown below.

In its broadest aspect, the present invention provides apparatus for digitally demodulating or modulating colour television chrominance signals, comprising a sampling analogue-to-digital converter whereby the signal to be demodulated or modulated is sampled and digitized in response to clock pulses establishing the sampling rate, a q-value memory of sine-fuction values for generating a series of digital values establishing a subcarrier signal for the demodulation or modulation, and means responsive to the clock pulses to repeatedly add a value p to an address accessing the digital values from the memory, the values p and q being integers whose ratio p/q at least approximately establishes the ratio of the clock pulse period to the subcarrier period.

It is noted that the generation of frequencies ralated by integer ratios already forms the subject matter of our British Pat. No. 1,455,821.

In essence the clock period is a fraction p/q of the subcarrier period and the address can equally well be thought of as specifying the subcarrier phase angle for each sampling point, as a fraction of $2\pi$. Naturally the incrementing of the address proceeds modulo-q.

The value q is subject to various constraints. It must be large enough to achieve adequate quantization accuracy. It must not be too large; otherwise the memory has to be too large. It is desirably a power of 2, i.e. $q=2^N$ since memory such as ROM memory is available with a number of locations which is invariably a power of 2. A suitable value may well be $N=11$, $q=2048$, employing 2K ROM memories, and resolving the subcarrier cycle into steps of 0.176 degrees.

Apart from these constraints, p/q ought to be a proper fraction which exactly equals the ratio of sampling period $t_s$ to subcarrier period $t_{sc}$. If $t_s$ is determined by other considerations, it will in all likelihood be impossible to meet all the conditions without some extension of the invention.

Thus, as already noted, it is often a considerable advantage to use luminance and colour difference signals (Y, U and V) based on a line-locked sampling grid. Since, at present, most signals are PAL or NTSC encoded at the source, a colour decoder is needed to provide Y, U and V signals. In some respects, it would be advantageous to sample the encoded PAL or NTSC signals with a subcarrier-locked sampling frequency as this would simplify the digital demodulation process. However, in many other respects this is inconvenient; in particular, it does not provide an orthogonal sampling grid and thus requires a change of sampling frequency to produce line-locked YUV. Because of this, it is desirable to sample the encoded signals using a line-locked frequency and to accept the greater complication in the line-locked demodulation process.

There is normally a fixed mathematical relationship between the subcarrier frequency ($f_{sc}$) and the line frequency ($f_h$) in a PAL signal:

$$f_{sc} = \left(283\tfrac{3}{4} + \frac{1}{625}\right) f_h = \frac{709379}{2500} f_h$$

Similarly, for NTSC:

$$f_{sc} = \frac{455}{2} f_h$$

Therefore, there is also a relationship between a line-locked sampling frequency ($f_s$) and the subcarrier frequency. If $$f_s = nf_h$$

then for PAL:

$$f_{sc} = \frac{709379}{2500n} f_s$$

and for NTSC:

$$f_{sc} = \left(\frac{455}{2n}\right) f_s$$

These ratios can be expressed in terms of the subcarrier period ($t_{sc}$) and the sampling period ($t_s$):

$$\frac{t_s}{t_{sc}} = \frac{709397}{2500n} \text{ for } PAL$$

and $$\frac{t_s}{t_{sc}} = \frac{455}{2n} \text{ for } NTSC$$

We accordingly require $$\frac{p}{q} = \frac{t_s}{t_{sc}} = \frac{709379}{2500n} = \frac{709379}{2040000} \text{ for } PAL \text{ with } n = 816$$

and $$\frac{p}{q} = \frac{t_s}{t_{sc}} = \frac{455}{2n} = \frac{455}{1600} \text{ for } NTSC \text{ with } n = 800$$

Neither value of q is a power of 2 and the PAL value of 2040000 would require impossibly large ROM storage.

In order to deal with this problem the value p/q can be chosen to yield an acceptable q and such that the exact ratio of clock pulse period to subcarrier period is given by the ratio of $p+(r/s)$ to q where r/s is another proper fraction. s need not be a power of 2. At each clock pulse, r is added modulo-s to the contents of an accumulator and, at each overflow, a further 1 is added to the address.

For the PAL example already given, the ratio $t_s:t_{sc}$ is split into a binary fraction in 2048'ths and a non-binary remainder by the following steps:

$$\frac{t_s}{t_{sc}} = \frac{709379}{2040000}$$

$$= \frac{1}{2048}\left(\frac{2048 \cdot 709379}{2040000}\right)$$

$$= \frac{1}{2048}\left(\frac{32 \cdot 709379}{31875}\right) = \frac{\left(\frac{22700128}{31875}\right)}{2048}$$

$$= \frac{712\frac{5128}{31875}}{2048}$$

Accordingly
p=712
q=2048
r=5128 (or 10256)
s=31875 (or 63750)

The values for r and s in brackets may be preferred as 31875 requires only 15 bits; the double value 63750 uses 16 bits and 16-bit registers and adders are stock items.

For the NTSC example it is desirable to have the same value of q and make s of comparable size to the PAL value, in order that basically the same hardware can handle either option. Accordingly:

$$\frac{t_s}{t_{sc}} = \frac{455}{1600}$$

$$= \frac{1}{2048}\left(\frac{2048 \cdot 455}{1600}\right)$$

$$= \frac{1}{2048}\frac{32 \cdot 91}{5} = \frac{\left(\frac{2912}{5}\right)}{2048}$$

$$= \frac{582\frac{2}{5}}{2048} = \frac{582\frac{16384}{40960}}{2048}$$

For demodulation purposes it is necessary not only to establish the correct subcarrier frequency in the manner explained but also to establish the correct phase. In addition, under some circumstances the relationship between the line frequency and the subcarrier frequency might not be maintained exactly. This could arise either because the signals were not modulated in the correct relationship at the coder, or because of variations in the nominally line-locked sampling frequency adjustment for the digitally generated subcarriers is necessary. As a frequency control can be used to obtain a phase change, a separate phase control is not needed.

A digital phase error signal can be employed to effect the necessary correction by modifying the value r as explained more fully below.

The invention will be described in more detail, by way of example, with reference to the accompanying drawings, in which:

FIG. 2 shows explanatory waveforms produced by demodulating the colour burst,

FIG. 3 shows a circuit for detecting the presence of the colour burst,

Figure 1:
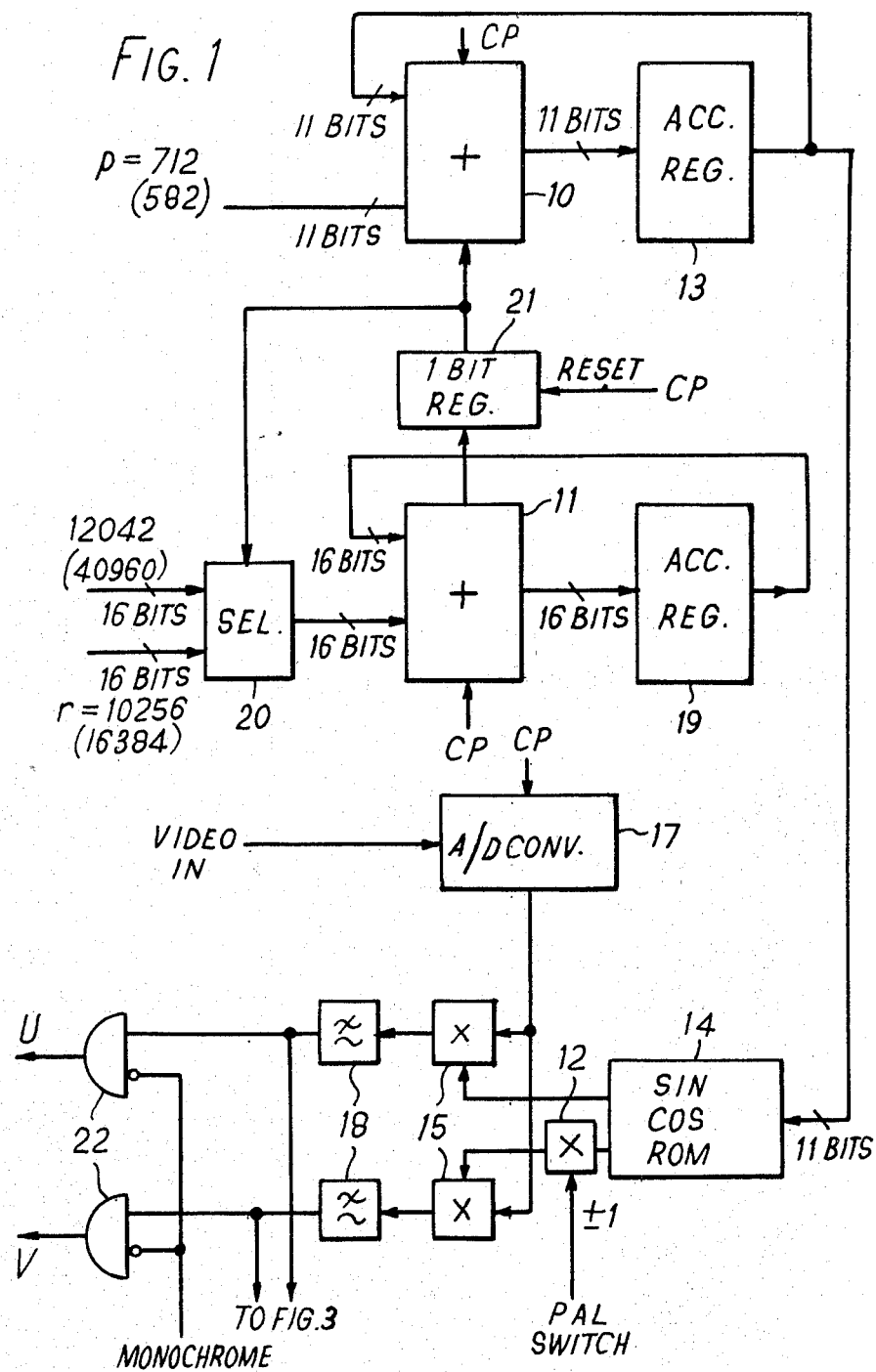
FIG. 1 is a block diagram of an embodiment of the invention.

Referring to FIG. 1 which relates specifically to the PAL example already discussed, with $f_s = 816\,f_h$, two parallel adders 10 and 11 are clocked by pulses CP at this sampling frequency. The adder 10 is an 11-bit adder which adds 712 to the contents of an 11-bit accumulator register 13 which provides an 11-bit subcarrier reference phase signal as an address to sine and cosine ROMs 14. The sine and cosine values are applied to two four-quadrant digital multpliers 15 to multiply the line-locked sampled video input provided by a analogue-to-digital converter 17, whereby digital, demodulated U and V signals are provided at the outputs of low pass digital transversal filters 18. The phase of the cosine subcarrier has to be switched from line to line. This is effected by a circuit 12 controlled by the PAL switch signal and which creates the 2's complement of the cosine value in alternate lines.

The adder 11 is a 16-bit adder which normally adds 10256 to the contents of another accumulator register 19. $2^{16} = 65536$ whereas it is necessary to count modulo 63750. Therefore, when the adder 11 generates an overflow bit, the count is jumped by 1786 which is the difference between 65536 and 63750. To do this without an extra add cycle, a selector 20 substitutes the value $12042 = 10256 + 1786$ for 10256 when an overflow bit is buffered in a 1-bit register 21. The register is reset by every clock pulse CP. A bit buffered in the register 21 also adds 1 into the least significant carry input of the adder 10 whereby, whenever the adder 11 overflows, the next clock pulse causes the contents of the register 13 to be incremented by 713 instead of 712.

The preset numbers input to the adder 10 and selector 20 are set up by patching each bit line to 0 or 1 logic level. It can readily be checked that changing the numbers to the numbers in brackets will enable the circuit to operate for the NTSC example given above with $f_s = 800\,f_h$.

FIG. 1 is drawn for a demodulator but essentially the same circuit (without low-pass filters 18) can be used as a modulator. In order to ensure correct subcarrier phase, as represented by the addresses to the ROM 14, the following additional features are provided for the demodulator.

Since U and V outputs are required from the demodulators, (multipliers 15), it is convenient to make the demodulating subcarrier waveforms suitably phased to achieve this directly. In addition, switching the V subcarrier polarity on alternate lines avoids the need for a separate PAL switch demodulator.

In a conventional decoder, the incoming subcarrier reference burst is fed directly to an auxiliary phase detector. This provides a control signal for the subcarrier reference oscillator and a 7.8 kHz PAL switch waveform. If this method were to be implemented with digital circuits using a line-locked sampling frequency; additional multiplier and low-pass filter would be needed, besides those shown in FIG. 1. It is more efficient, therefore, to obtain a control signal from the demodulated versions of the burst produced by the U and switched-V demodulators.

The waveforms produced by demodulating the colour synchronising burst are shown for the U and V channel outputs in FIG. 2. The full lines show the outputs given when the demodulating subcarriers are correctly phased, whilst the dashed lines show the limits of the range of the waveforms for arbitrarily phased subcarriers.

It is beneficial to average several samples from the centre portion of the demodulated burst waveforms to reduce the effect of noise and distortion. This is achieved conveniently by summing the sample values in an accumulator 24 using an adder 23 as shown in FIG. 3. The accumulator register 24 is set to zero by a pulse suitably delayed from the falling edge of the line synchronising pulse and, after several samples, (sixteen is a convenient number) the accumulated total is transferred to a second register 25. Similar circuits are used in both the U and V channels and the operations are timed by a circuit 26. The signals provided by the register 25 are denoted $U_{sc}$ and $V_{sc}$.

To test for the presence of a colour burst, the magnitudes of the accumulated totals are compared against a threshold, chosen to accept bursts of relatively low amplitude, but to reject noise if no burst is present. A burst is judged to be present if the magnitude in either channel exceeds the threshold; this is because, for some phases of the demodulating subcarriers, zero output in one channel will result. A convenient method of making the threshold comparison is to feed the four most significant bits of each total to a read-only memory 27, programmed to perform the desired logic. Alternatively, an equivalent result could be obtained with normal logic gates.

The detection of the presence of a colour burst is used to determine whether the signal is monochrome, denoted by a complete absence of bursts, or colour. Since the colour burst is missing from 9 lines in the field blanking interval of a colour signal, it is necessary to count the absence of bursts. Thus, a counter 28 is enabled each time there is no burst and cleared whenever a burst occurs. If the counter exceeds 9, the signal is judged to be monochrome and the outputs of U and V demodulators are inhibited. A knowledge of the presence of a colour burst is also required for the PAL switch detection method described below.

Thus the U and V signals (FIG. 1) can be prevented from passing to subsequent circuitry (e.g. in a standards converter) by disabling gates 22 in the presence of the monochrome signal.

The colour synchronising burst can be represented by the expression:

$$-A \sin \omega t + A \cos \omega t$$

in which $\omega = 2\pi f_{sc}$ and A represents the amplitude of the burst components; the U-phase component is equal to $-A$ and the V-phased component is $+A$. Demodulation consists of multiplying by sine and cosine waves and low-pass filtering the resulting outputs. Before the reference subcarrier oscillator formed by the circuit of FIG. 1 has locked up, its phase is arbitrary; so the demodulating subcarrier waveforms are represented by 2 $\sin (\omega t + \theta)$ for the U channel, and $\pm 2 \cos (\omega t + \theta)$ for the V channel. The phase term $\theta$ allows for the arbitrary phasing of the subcarriers. For the U channel:

$$2 \sin (\omega t + \theta)(-A \sin \omega t \pm A \cos \omega t) = -A \cos \theta + A \cos (2\omega t + \theta) \pm A \sin (2\omega t + \theta) \pm A \sin \theta$$

which, when low-pass filtered, becomes:

$$U = -A \cos \theta \pm A \sin \theta$$

For the V channel:

$$\pm 2 \cos (\omega t + \theta)(-A \sin \omega t \pm A \cos \omega t) = \mp A \sin (2\omega t + \theta) \pm A \sin \theta + A \cos (2\omega t + \theta) + A \cos \theta$$

which, when low-pass filtered becomes:

$$V = \pm A \sin \theta + A \cos \theta$$

The $\sin \theta$ term of these two expressions can be extracted by averaging the accumulated totals from the U and V channels to cancel the $\cos \theta$ terms. Also the average has to be inverted on alternate lines to cancel the effect of the PAL switch. Thus:

$$\pm \tfrac{1}{2}(U+V) = A \sin \theta$$

which results in a phase detector with a sinusoidal characteristic.

Figure 4:
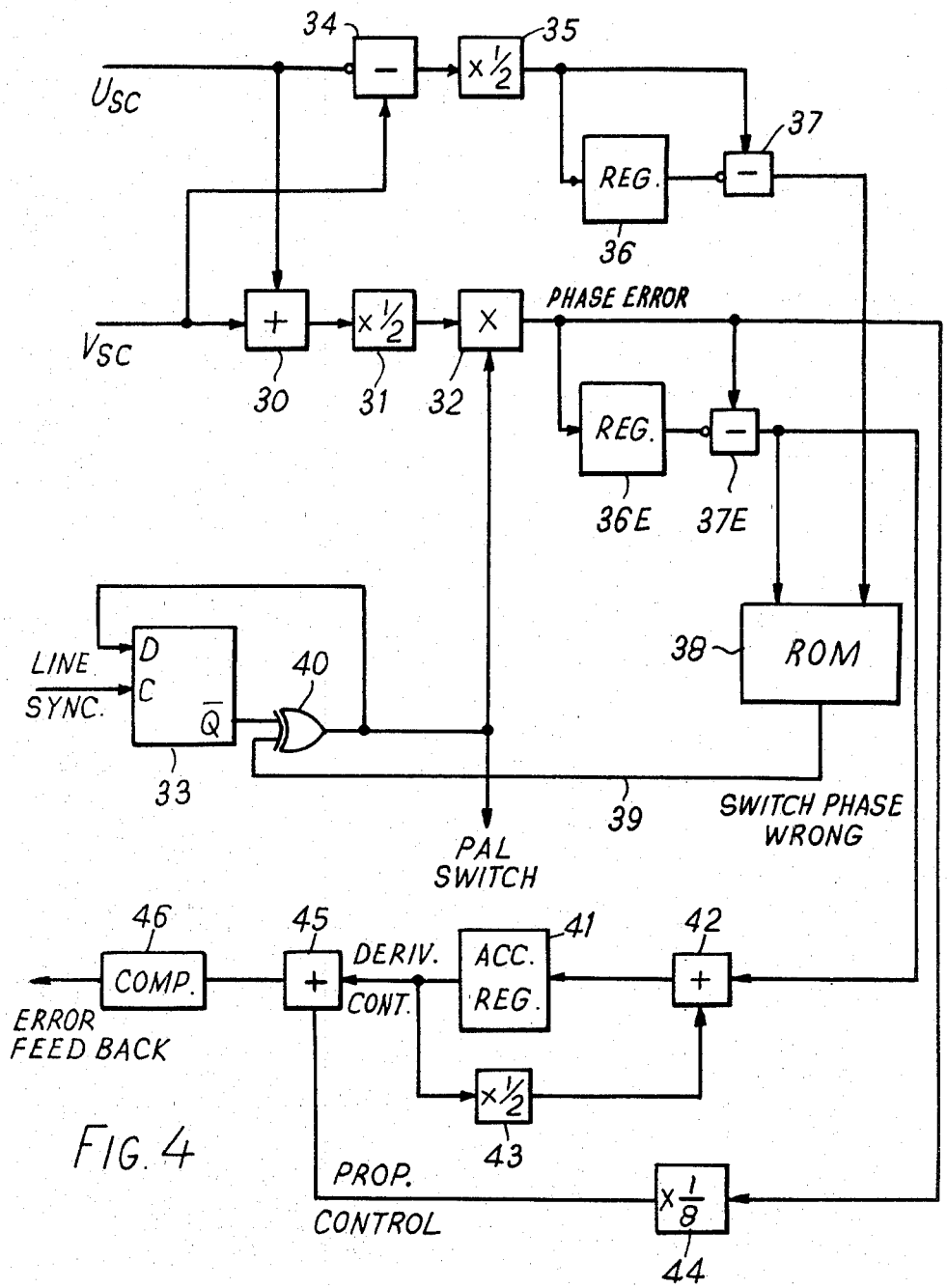
FIG. 4 shows a circuit for deriving an error feedback signal to correct for phase error of the subcarrier relative to the colour burst.

The circuit employed is shown in FIG. 4. $U_{sc} + V_{sc}$ is formed by an adder 30. Circuit 31 multiplies the sum by $\tfrac{1}{2}$. The PAL switch waveform applied to a circuit 32 passes the signal unchanged in alternate lines and inverts it in intervening lines by producing the 2's complement.

It has been assumed that the PAL switch sense of the demodulating V subcarrier was correct. However, since this is derived from a bistable circuit 33 changing state at every line synchronising pulse, the switch sense may be incorrect. If this is so, then the low-pass filtered output of the V channel is inverted, that is:

$$V = \mp A \sin \theta = A \cos \theta$$

so that the phase error signals becomes:

$$\pm \tfrac{1}{2}(U+V) = \mp A \cos \theta$$

which changes sign from one line to the next. The fact that PAL switch is incorrect can be determined, therefore, by detecting large differences in phase from one line to the next. If $\cos \theta$ is small, then it will not be immediately apparent that the PAL switch is incorrect. This can be avoided by producing a second signal, orthogonal to the first, that is:

$$\tfrac{1}{2}(V-U) = A \cos \theta$$

if the PAL switch sense is correct, or $$\tfrac{1}{2}(V-U) = \mp A \sin \theta$$

if the PAL switch sense is incorrect.

Similarly, in this signal, incorrect PAL switch sense is shown by large differences in phase from one line to the next. In particular, if $\cos \theta$ is small, then $\sin \theta$ will be large, so incorrect PAL switch sense can be detected directly by a large line-to-line difference in one or other of these signals.

The signal $(V-U)$ is produced by a subtracting circuit 34, and a $\times \tfrac{1}{2}$ circuit 35.

The signals $\tfrac{1}{2}(U+V)$ and $\tfrac{1}{2}(V-U)$ are loaded into registers 36 and 36E and subtracting circuits 37 and 37E produce difference signals by subtracting from the current signals the previous signals in the registers.

As with burst detection, detection of a PAL switch phase error is conveniently performed using a ROM 38 fed with the four most significant bits of each difference signal. The ROM is programmed to provide a "phase wrong" signal on line 39 if any input bit is 1.

The PAL switch bistable 33 produces a waveform changing state at line synchronising pulse intervals unless the waveform is inverted with a signal from the comparison ROM 38 by an exclusive-OR gate 40.

The logic following the comparison ROM 27 is complicated by the absence of bursts during the field blanking interval. This is because a correct amplitude burst followed by no burst, or vice versa, will be detected as a large line-to-line difference, even though the PAL switch sense may be correct. Therefore, if either the current line or the previous line contains no burst (as shown by the burst detection circuit), then the PAL switch correction must be disabled. Also, if a PAL switch correction has been made in the previous line, the comparison circuit may given an incorrect indication that the sense is still wrong. This is because the registers used in the detection of large line-to-line differences will still contain values from before the correction was made. Therefore, the PAL switch correction is disabled during the line following one in which a correction has been made. These details are not shown for simplicity.

This method will normally obtain the correct PAL switch sense, at most, two lines after the signal has been connected. This ensures the loop lock-up time is not significantly retarded by incorrect PAL switch sense.

The error signal produced by the phase detector must be filtered to obtain suitable stability characteristics and noise suppression for the burst phase-locked loop as a whole. One suitable form of filter combines a proportional control component with a derivative control component. This is also shown in FIG. 4.

The derivative control is formed using the subtractor 37E to obtain the difference between the current phase error and the previous phase error, stored in the register 36E. The resulting differences are fed to a leaky integrator formed by an accumulator in which the previous total is halved before addition to produce the next total. The accumulator is formed by register 41 adder 42 and $X\frac{1}{2}$ circuit 43. The phase error signal itself is multiplied by $\frac{1}{8}$ in a circuit 44 and an adder 45 sums the proportional and derivative control signals to yeild the filtered error signal. The sign is inverted by complementer 46 since negative feedback control is required.

Figure 5:
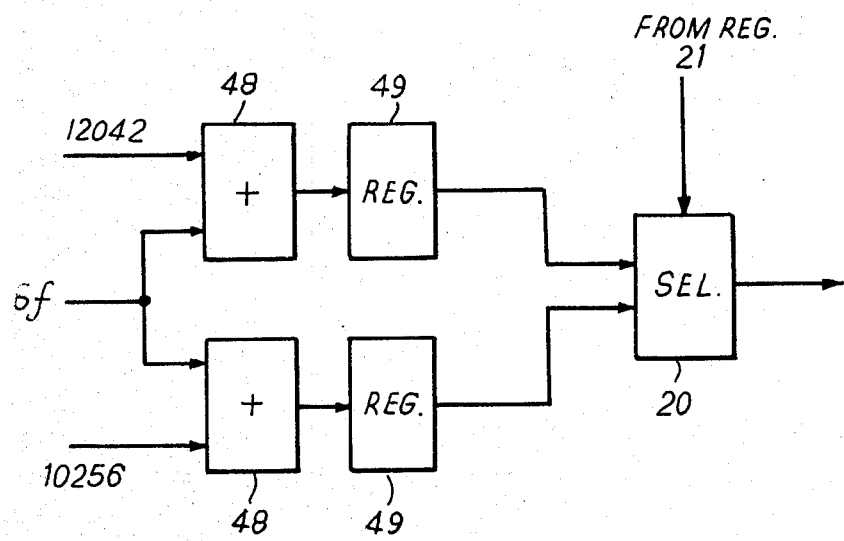
FIG. 5 shows a modification of part of FIG. 1 for utilization of the error feedback signal.

FIG. 5 shows how the error feedback signal is employed. Instead of applying the 12042 and 10256 values directly to the selector 20 the values are actually adjusted by the error feedback signal. The overall gain of the loop is determined by the level at which the output bits from the error filter are fed into the ratio counters. Using the most significant bit of the filter output at the most significant bit level of the lower ratio counter has been found to give satisfactory results.

The error feedback signal is denoted $\delta f$. This is a digital code, changing at line rate, which represents the sense and amount by which the subcarrier frequency should be changed from its mathematical relationship, in order first to lock the loop and subsequently to keep it in lock.

$\delta f$ is used to adjust r by adding $\delta f$ to the preset values 10256 and 12042 in adders 48. The results are stored in registers 49 which provide the inputs to the selector 20. A convenient way of effecting the selection is to use registers 49 with tri-state outputs and to use the signal from the register 21 (FIG. 1) to enable the appropriate output. The ratio altered by the factor $\delta f$ is used throughout the whole of one line until the next burst is decoded and a new value of $\delta f$ is substituted. By this means, the phase, frequency and PAL switch sense of the demodulating subcarriers can be matched to those of the incoming signal.

The same demodulator arrangement can be converted to NTSC operation by making a few relatively minor changes. In particular, the NTSC system uses I and Q signals which have different bandwidths. It is necessary, therefore, to demodulate the signal along I and Q axes, to filter the resulting signals with the appropriate characteristics and then to matrix the I and Q signals to obtain U and V according to the following equations.

$$U = Q \cos 33° - I \sin 33°$$

$$V = Q \sin 33° + I \cos 33°$$

The subcarrier synchronising controller then uses the demodulated U and V signals to produce a phase error signal.

In the NTSC system, the colour synchronising burst can be represented by the expression:

$$-A \sin \omega t$$

because the burst has no V component.

When this is multiplied by arbitrarily phased subcarriers, $2 \sin(\omega t + \theta)$ and $2 \cos(\omega t + \theta)$, for the U channel:

$$2 \sin(\omega t + \theta)(-A \sin \omega t) = -A \cos \theta + A \cos(2\omega t + \theta)$$

which when low-pass filtered gives:

$$-A \cos \theta$$

and for the V channel:

$$2 \cos(\omega t + \theta)(-A \sin \omega t) = -A \sin(2\omega t + \theta) + A \sin \theta$$

which, when low-pass filtered, gives:

$$A \sin \theta$$

Thus, it is possible to use the V output (after averaging in the accumulator) directly as the input to the phase error filter. The V-switch circuitry used for PAL should be disabled for NTSC operation. Otherwise, apart from changing the ratios in the ratio counters, the method is unchanged.

The methods of generating and locking subcarrier waveforms described for use in decoders could also be used in coders based on line-locked sampling. In this case, suitably filtered baseband colour difference signals could be modulated by digital multipliers on to quadrature subcarriers generated as described. The resulting chrominance signals would then be added together and to the luminance signal to form the encoded video signal.

The phase output of the ratio counters can be used to generate a $2f_{sc}$ waveform by using a read-only memory containing a waveform of half the period of those used to generate the demodulating subcarriers. When modulated PAL chrominance signals are multiplied by this waveform, the resulting product signal contains components in which the sense of V-switch has been inverted. This process is useful for combining modulated chrominance signals from different lines for use in methods of vertical filtering.

It will be appreciated that many modifications may be made to the apparatus described and illustrated. In particular, it should be noted that the size of the ROM 14 in FIG. 1 can be reduced from 2048 words to 512 words by storing only the first quarter or quadrant of the sine function. The full sine waveform can then be generated by complementing the address for the second and fourth quadrants, and by complementing (inverting) the output in the third and fourth quadrants. The storage required for the cosine function can be reduced by similar techniques, and the inversion required for the PAL switch modulation (block 12 on FIG. 1) can be incorporated with little additional complication.

The numerical values applied to the selector 20 in FIG. 1 for the NTSC example are derived as follows. The normal increment is 16384. As noted $2^{16}=65536$ whereas it is now needed to count modulo 40960. Therefore when the adder 11 generates an overflow bit, the counter is jumped by 24576 which is the difference between 65536 and 40960. To do this, the selector 20 substitutes the value 40960=24576+16384 for 16384 when an overflow bit is buffered in the register 21.

I claim:

1. Apparatus for digitally demodulating or modulating colour television chrominance signals, comprising a source of clock pulses, a sampling analogue-to-digital converter responsive to the signal to be demodulated or modulated and to the clock pulses to sample and digitize said signal, a q-value memory storing an integral number q of sine-function values for generating a series of digital samples of a subcarrier signal having a predetermined period for the demodulation or modulation, a register for an address accessing the digital values from the memory, and means responsive to the clock pulses to repeatedly add a value p to said address, the integers p and q having a ratio p/q at least approximately equal to the ratio of the period of the clock pulses to the subcarrier period.

2. Apparatus according to claim 1, comprising a line-locked generator of the clock pulses which produces the clock pulses at a frequency which is an integral multiple of the line frequency of the television signals.

3. Apparatus according to claim 1, further comprising means arranged to accumulate a number r modulo s by repeatedly adding r in response to the clock pulses, where r and s are further integers and r/s is a proper fraction, and means responsive to each overflow of these accumulating means to additionally increment the said address, whereby the exact ratio of the clock pulse period to the subcarrier period is given by $$\left(p + \frac{r}{s}\right)/q$$

4. Demodulating apparatus according to claim 3, comprising means responsive to the demodulated chrominance signals during colour bursts to provide phase error information, and means responsive to the phase error information to adjust the value of r in the sense tending to eliminate phase error.

5. A digital phase locked loop comprising a source of clock pulses, means responsive to each clock pulse to increment a cyclically counting counter arrangement including integer and fraction counting means, the integer counting means counting modulo q where q is a first integer, means responsive to each clock pulse to increment said arrangement with a digital number p+(r/s), where p, r and s are second, third and fourth integers such that the mean ratio of the increment p+(r/s) to the modulus q of the counting cycle is a proper fractional expression, the integer counting means thereby providing a periodically varying sequence of digital values representing phase angles of a periodic signal, a phase comparator arrangement responsive to said digital values and to a reference signal to provide an error signal, and means responsive to the error signal to adjust the value of one of said integers to null out the phase error.

6. A digital phase locked loop according to claim 5, wherein the means responsive to the error signal adjust the value of the third integer r.

7. A digital phase locked loop according to claim 6, wherein the fraction counting means has a count cycle greater than s, and means arranged to alter r to a modified integer value r' once in each count cycle, where the value r' causes the effective count cycle to become equal to s, and wherein the means responsive to the error signal adjust the values of r and r' concurrently.

8. A digital phase locked loop according to claim 5, wherein the phase comparator arrangement comprises a ROM addressed by said digital values to provide digitised values of a sinusoidal signal, means for multiplying the digitised value with digitised values of the reference signals to provide product values, and means for low-pass filtering the product values.

* * * * *